(12) United States Patent
Yoon et al.

(10) Patent No.: US 7,527,752 B2
(45) Date of Patent: May 5, 2009

(54) METHOD FOR SURFACE TREATMENT OF NICKEL NANOPARTICLES WITH ORGANIC SOLUTION

(75) Inventors: Seon Mi Yoon, Gyeonggi-do (KR); Jae Young Choi, Gyeonggi-do (KR); Yong Kyun Lee, Gyeonggi-do (KR); Hyun Chul Lee, Ulsan-si (KR)

(73) Assignee: Samsung Electro-Mechanics Co., Ltd., Suwon-Si, Gyeonggi-Do (KR)

( * ) Notice: Subject to any disclaimer, the term of this patent is extended or adjusted under 35 U.S.C. 154(b) by 504 days.

(21) Appl. No.: 11/165,352

(22) Filed: Jun. 24, 2005

(65) Prior Publication Data
US 2006/0289838 A1  Dec. 28, 2006

(30) Foreign Application Priority Data
Nov. 24, 2004 (KR) .............. 10-2004-0096833

(51) Int. Cl.
B22F 1/00 (2006.01)
B22F 9/00 (2006.01)
B22F 9/16 (2006.01)

(52) U.S. Cl. .................. 252/513; 252/500; 75/369; 75/343; 148/513; 419/30

(58) Field of Classification Search .......... 428/402, 428/403, 357; 75/255, 343, 369, 392, 430; 75/370–374; 148/312, 406; 252/62.2, 512, 252/513; 427/212; 361/306.3, 305, 321.2; 977/777, 810
See application file for complete search history.

(56) References Cited

U.S. PATENT DOCUMENTS

| | | | | |
|---|---|---|---|---|
| 4,059,463 A | * | 11/1977 | Aonuma et al. | 75/349 |
| 4,539,041 A | | 9/1985 | Figlarz et al. | |
| 5,175,024 A | * | 12/1992 | Mack | 427/216 |
| 5,590,387 A | * | 12/1996 | Schmidt et al. | 419/36 |
| 5,759,230 A | * | 6/1998 | Chow et al. | 75/362 |
| 6,120,576 A | | 9/2000 | Toshima et al. | |
| 6,551,527 B2 | * | 4/2003 | Yoshida et al. | 252/512 |
| 6,620,220 B2 | * | 9/2003 | Ito et al. | 75/362 |
| 6,632,524 B1 | * | 10/2003 | Toshima et al. | 428/357 |
| 7,182,801 B2 | * | 2/2007 | Kim et al. | 75/255 |

FOREIGN PATENT DOCUMENTS

| | | |
|---|---|---|
| JP | 4-235201 | 8/1992 |
| JP | 2000-345202 | 12/2000 |
| JP | 2003-129105 | 5/2003 |

* cited by examiner

*Primary Examiner*—Stanley Silverman
*Assistant Examiner*—Kallambella Vijayakumar
(74) *Attorney, Agent, or Firm*—Buchanan Ingersoll & Rooney PC

(57) ABSTRACT

A method for surface treatment of nickel nanoparticles using an organic solution, including dispersing nickel nanoparticles in a reductive organic solvent to obtain homogeneity; heating the dispersion of nickel nanoparticles; and separating the solution after treatment, washing and drying. Nickel nanoparticles treated by this method are preferably substantially free of impurities remaining on particle surfaces and thus have smooth surfaces and increased tap density, and the use thereof enables efficient production of a multi-layer ceramic capacitor.

7 Claims, 5 Drawing Sheets

METHOD FOR SURFACE TREATMENT OF NICKEL NANOPARTICLES WITH ORGANIC SOLUTION

BACKGROUND OF THE INVENTION

This non-provisional application claims priority under 35 U.S.C. §119(a) on Korean Patent Application No. 2004-96833 filed on Nov. 24, 2004, which is herein expressly incorporated by reference.

1. Field of the Invention

The embodiments of the present invention relate to a method for surface treatment of nickel nanoparticles using an organic solution. More particularly, the embodiments of the present invention relate to a method for surface treatment of nickel nanoparticles comprising: 1) dispersing nickel nanoparticles in a reductive organic solvent to obtain a dispersion; 2) heating the dispersion to increase a surface homogeneity of the nanoparticles; 3) separating the nanoparticles from the dispersion; and 4) washing and drying the nanoparticles.

2. Description of the Related Art

A multi-layer ceramic capacitor (MLCC) is prepared by laminating a multiplicity of dielectric thin film layers and a multiplicity of internal electrodes. The MLCC having such a structure exerts large capacitance even with a small volume and thus is widely used in electronic instruments such as computers and mobile communication instruments, for example.

As materials for internal electrodes of the MLCC, Ag—Pd alloys have been used. Since Ag—Pd alloys can be sintered in the air, they are easily applicable to MLCC manufacturing, but are disadvantageously expensive. Therefore, in order to reduce MLCC production costs, since the late 1990's, a great deal of efforts have been made to replace Ag—Pd alloys with relatively cheap nickel, as an internal electrode material. Internal nickel electrodes of the MLCC are formed from a conductive paste containing nickel metal particles.

Processes for preparing nickel metal particles are broadly divided into a vapor phase method and a wet chemical method. The vapor phase method is widely used due to the fact that shapes of nickel metal particles and impurities are relatively easily controlled, but is disadvantageous from the standpoints of particle micronization and large-scale production. In contrast, the wet chemical method is advantageous in that large-scale production is easily implemented and initial investment costs and process costs are inexpensive.

The wet chemical method may be sub-divided into two types. One is a method using nickel hydroxide as a starting material that is converted into nickel metal particles. The other is a method using nickel precursor materials other than nickel hydroxide, such as nickel salts and nickel oxides, as a starting material that is converted into nickel metal particles.

The first method is advantageous in that a manufacturing process is relatively simple, but also suffers from disadvantages in that the starting material, nickel hydroxide, is expensive and controlling particle size of nickel metal particles is not easy.

The second method is disadvantageous due to relatively complex processes. But it has an advantage in that inexpensive nickel precursor materials such as nickel sulfate, nickel chloride and nickel acetate may be used as the starting material, and it is relatively easy to control the particle size ranging from several tens of nm to several hundreds of nm.

As patents relating to the wet chemical method, reference may be made to U.S. Pat. Nos. 4,539,041 and 6,120,576.

U.S. Pat. No. 4,539,041 proposes a method of obtaining metal powder, involving dispersing gold, palladium, platinum, iridium, osmium, copper, silver, nickel, cobalt, lead and cadmium in the form of an oxide, hydroxide or salt thereof, in a liquid polyol as a reducing agent and thereafter heating them.

U.S. Pat. No. 6,120,576 proposes a method for preparing nickel metal powder comprising the steps of mixing an aqueous sodium hydroxide solution with an aqueous solution of nickel sulfate to form nickel hydroxide; reducing the resulting nickel hydroxide with hydrazine to produce nickel; and recovering nickel thus produced.

In the above-mentioned methods, an alkali is added in order to effect conversion of the nickel precursor compound into nickel hydroxide. As the alkali added, sodium hydroxide, potassium hydroxide or the like is conventionally used. In order to synthesize nickel fine powder, the desired reaction should be performed in the presence of a strong base, depending on reaction conditions, and such environment allows for formation of $Ni(OH)_2$ on a nickel surface and the thus formed surface $Ni(OH)_2$ grows to plate-like or needle-like particles depending on reaction conditions.

In order to provide a high capacitance MLCC, packing density of particles should be high. However, such secondary particles referred above, during an MLCC process, contribute to lower density in packing and occurrence of shorts. Therefore, a smoothness of the particle surface is required.

Japanese Patent Publication Laid-open No. Hei 4-235201 discloses a method involving adding metal powder to stearic acid dissolved in an organic solvent and removing the organic solvent via evaporation from the mixture so as to control tap density of powder. Japanese Patent Publication Laid-open No. Hei 12-345202 discloses surface treatment of nickel microparticles with decanoic acid, caprylic acid, palmitic acid, linolic acid, linoleic acid, oleic acid, stearic acid or the like, so as to effect high tap density, high packing density of nickel fine powder in a paste, and, at the same time, in particular, thin application thickness of the paste to obtain internal electrodes of a laminated ceramic condenser at a predetermined thickness. Japanese Patent Publication Laid-open No. Hei 15-129105 discloses a method involving first surface treatment of nickel powder with an aqueous solution containing water-soluble fatty acid salts and then heating the mixture to volatilize the solvent. However, the above-mentioned methods may entail occurrence of particle-particle aggregation upon heating and thus there still remains a need for a method capable of treating surfaces of nickel particles by a simplified process.

OBJECTS AND SUMMARY

Therefore, the embodiments of the present invention have been made in view of the above problems, and it is an object of the embodiments of the present invention to provide nickel particles having smooth surfaces and increased tap density, by treating surfaces of nickel nanoparticles with a reducing solvent to maintain original shape thereof, while removing impurities present as abnormal particles on surfaces of nickel particles.

In accordance with an aspect of the embodiments of the present invention, the above and other objects can be accomplished by the provision of a method for surface treatment of nickel nanoparticles comprising: 1) dispersing nickel nanoparticles in a reductive organic solvent to obtain a dispersion; 2) heating the dispersion to increase a surface homogeneity of the nanoparticles; 3) separating the nanoparticles from the dispersion; and 4) washing and drying the nanoparticles.

In accordance with another aspect of the embodiments of the present invention, there is provided nickel nanoparticles surface-treated by the above-mentioned method.

In accordance with yet another aspect of the embodiments of the present invention, there is provided a conductive paste comprising nickel nanoparticles thus treated.

In accordance with still another aspect of the embodiments of the present invention, there is provided a multi-layer ceramic capacitor (MLCC) nickel internal electrodes of which contain the thus treated nickel nanoparticles.

BRIEF DESCRIPTION OF THE DRAWINGS

The above and other objects, features and other advantages of the embodiments of the present invention will be more clearly understood from the following detailed description taken in conjunction with the accompanying drawings, in which.

DESCRIPTION OF THE PREFERRED EMBODIMENTS

The embodiments of the present invention will be described in more detail with reference to accompanying drawings.

Figure 1:
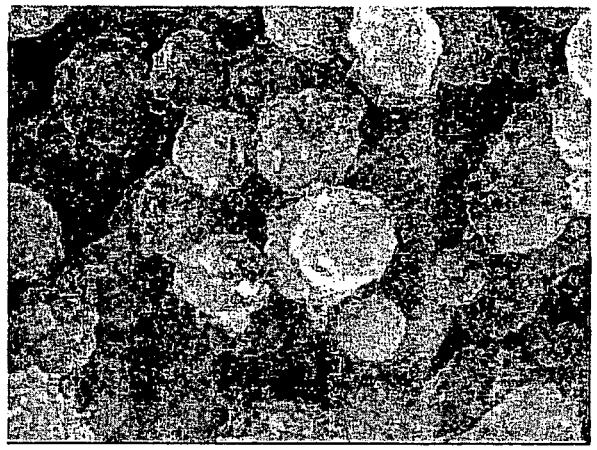
FIG. 1 is a SEM of the surface of nickel nanoparticles obtained by a wet chemical method in accordance with embodiments of the present invention.
Figure 2:
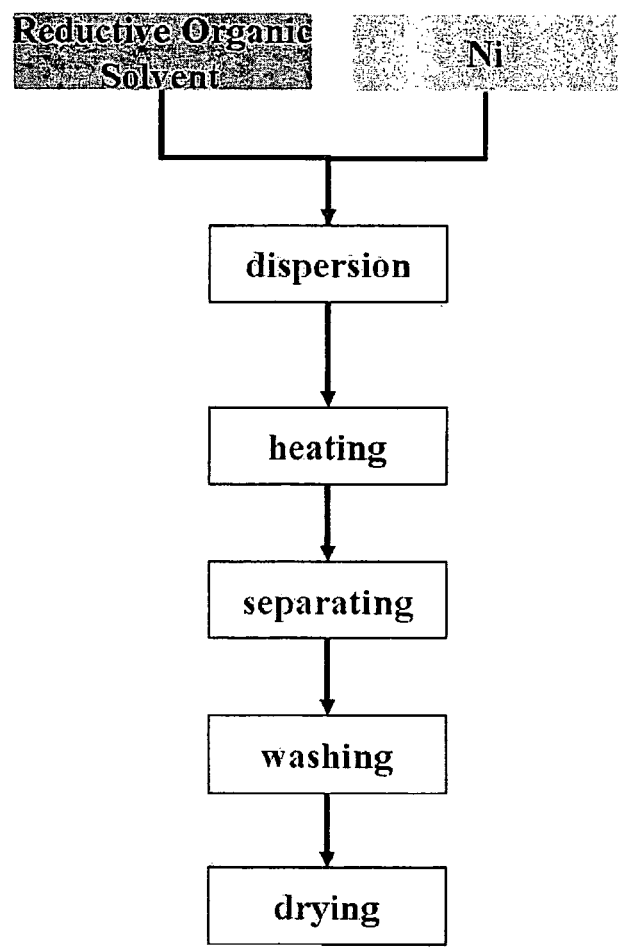
FIG. 2 is a schematic process flow diagram of surface treatment using an organic solution in accordance with embodiments of the present invention.

FIG. 1 is an SEM of nickel nanoparticles prepared by a method in accordance with embodiments of the present invention. As shown in FIG. 1, nickel nanoparticles obtained by a wet chemical method have $Ni(OH)_2$ or $Ni_2O_3$ grown or produced on their surfaces which are desired to be eliminated by a series of surface treatment processes in accordance with an embodiment of the present invention shown in FIG. 2. In an embodiment, the nickel nanoparticles are dispersed in a reductive organic solvent, then the dispersion of nickel nanoparticles and reductive organic solvent is heated to increase the surface homogeneity of the nanoparticles, preferably until the nanoparticles are substantially free of surface impurities, and after heat treatment, the nickel nanoparticles are separated from the dispersion, washed and dried.

In a method for surface treatment of nickel nanoparticles in accordance with embodiments of the present invention, the first step is to disperse nickel nanoparticles in a reductive organic solvent.

As herein used, the term "reductive organic solvent" refers to an organic solvent that is capable of reducing other compounds in the course of per se oxidation. Therefore, any one of oxidative organic solvents may be used as the reductive organic solvent. Preferably, primary or secondary alcohol solvents, or glycol type solvents may be used. More preferably, primary or secondary alcohols containing 3 to 8 carbon atoms or glycol containing 2 to 6 carbon atoms may be used.

As specific examples, propanediol, butanediol, pentanediol, octanol, ethyleneglycol, propyleneglycol, diethyleneglycol, dipropyleneglycol, hexyleneglycol, butyleneglycol, etc. can be mentioned.

Although there is no particular limit to the amount of the reductive organic solvent used, preferably it is effective to use nickel nanoparticles in the amount of 5 to 10% by weight, based on the organic solvent.

The reaction rate on the nickel metal surface may be varied depending upon the kind of the organic solvents used. Solvents having boiling points of more than 200° C. may cause interparticle aggregation due to increased reaction rate. That is, since the reductive organic solvent in embodiments of the present invention serves as both a reducing agent and the solvent for nickel precursor compounds, it is necessary to control the reaction rate in order to avoid aggregation between particles. Meanwhile, solvents having boiling points below 200° C., such as ethyleneglycol, 1,2-propanediol and octanol, exhibit moderate reaction rates, while solvents such as diethyleneglycol, triethyleneglycol, 1,3-propanediol and 1,4-butanediol, having boiling points of more than 200° C., exhibit fast reaction rates. In order to resolve problems associated with reaction rate, solvents having boiling points of more than 200° C. preferably require addition of a basic solution, and solvents having boiling points below 200° C. optionally require addition of a basic solution. Although the basic solution is not particularly limited, preferable examples are NaOH and KOH.

In order to effectively cope with problems associated with reaction rate, an amount of the basic solution added is preferably more than 0.1% by weight of the organic solvent and more preferably it is between 0.2 and 1% by weight of the organic solvent. Even though addition of larger amount of the base may more effectively control aggregation between particles, this may cause an increase of viscosity in the course of the reaction, thus making it difficult to separate and wash the resulting product.

The second step in the method for surface treatment of nickel nanoparticles in accordance with the embodiments of the present invention is to heat the dispersion of nickel nanoparticles. The heating temperature may vary depending upon solvents used, but should be near the boiling point of the solvent. That is, the heating temperature is preferably a temperature to ensure that reduction of the nickel metal surface sufficiently occurs in the solution of nickel metals. Conventionally, as the temperature of the heating step is elevated, the promotion of reduction is improved. However, at a temperature over a certain point, improvement in the promotion of reduction is saturated and moreover, deterioration of reactants may occur. Upon considering such factors, the temperature in the heating step is preferably 10° C. to 50° C. lower than the boiling point of the solvent.

Although the present method may be carried out using any open reaction vessel or closed reaction vessel, it is more preferred to use a closed reaction vessel when the temperature in the heating step is elevated to near the boiling point of the solvent used. An open or closed reaction vessel used in embodiments of the present invention may be further equipped with a condenser or reflux condenser.

In the heating step, the composition of the mixture varies with respect to the passage of time. The dispersion initially contains nickel particles, co-existing together with microparticles such as $Ni(OH)_2$ and $Ni_2O_3$, and a reductive organic solvent. As surface microparticles such as $Ni(OH)_2$ and $Ni_2O_3$ are progressively reduced into nickel metals, nickel metal particles may co-exist. After passage of a certain time, secondary particles present on the nickel surface are substantially reduced into nickel metal particles. Duration of the heating step may vary depending upon the temperature in the heating step and can be easily adjusted to a suitable time by those skilled in the art, if necessary.

The third step in the method for surface treatment of nickel nanoparticles in accordance with the embodiments of the present invention is to separate, wash and dry the heated dispersion.

Solvents utilized in washing the dispersion are not particularly limited, so long as they are conventionally used in the art. For example, acetone and ethanol may be used.

Although drying may be carried out under conventional atmosphere, drying may also be performed at room temperature under vacuum atmosphere.

In another aspect, the embodiments of the present invention provide nickel nanoparticles without surface impurities by using the above-mentioned method. Although there is no particular limit to a particle size, a preferable size may be in the range of 100 to 1,000 nm. Nickel nanoparticles in accordance with embodiments of the present invention can be utilized in various applications such as internal wiring materials of electronic circuits, catalysts and the like. In particular, nickel nanoparticles in accordance with embodiments of the present invention are preferably substantially free of surface impurities and have high tap density, and thus they are very suitable as materials for internal electrodes of MLCC.

In yet another aspect, the embodiments of the present invention provide a conductive paste comprising the above surface-treated nickel nanoparticles, an organic binder and an organic solvent. As the organic binder, for example, ethylcellulose or the like may be used. As the organic solvent, mention may be made of terpineol, dihydroxy terpineol, 1-octanol and kerosene, as examples. In the conductive paste in accordance with embodiments of the present invention, the content of the nickel nanoparticles may be 40 to 60% by weight, the content of the organic binder may be 0.8 to 4% by weight and the content of the organic solvent may be 40 to 60% by weight, for example. However, without being limited to the above-mentioned ranges, the composition ratio of the respective components may vary depending upon desired uses. In addition, the conductive paste in accordance with embodiments of the present invention may further comprise, for example additives such as a plasticizer, an anti-thickening agent and a dispersant. A variety of well-known methods may be employed to prepare the conductive paste in accordance with embodiments of the present invention.

In still another aspect, the embodiments of the present invention provide a multi-layer ceramic capacitor (MLCC), internal electrodes of which contain the thus-treated nickel nanoparticles.

Figure 3:
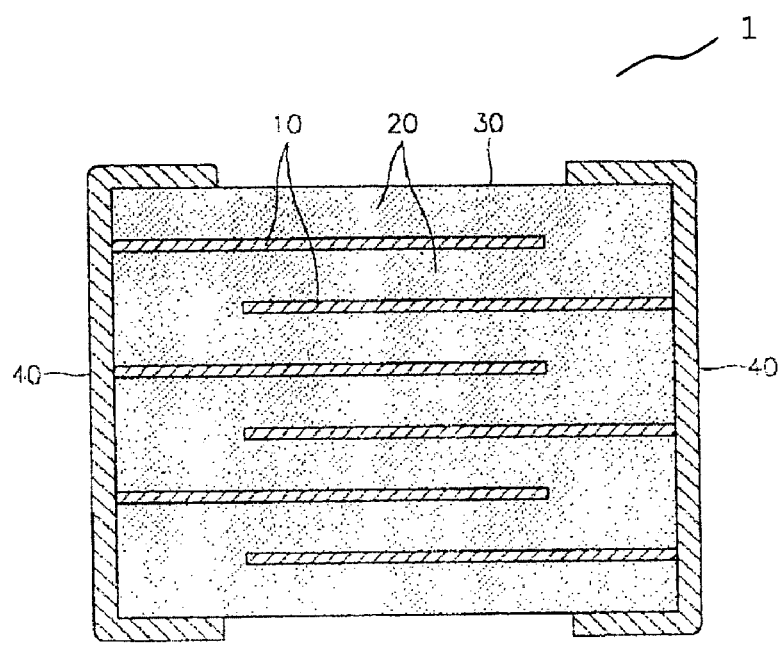
FIG. 3 is an exemplary diagram schematically showing one embodiment of an MLCC in accordance with embodiments of the present invention.

One embodiment of the MLCC 1 in accordance with the present invention is shown in FIG. 3. The MLCC of FIG. 3 is made up of a laminate 30 comprising internal electrodes 10 and dielectric layers 20, and terminal electrodes 40. The internal electrodes 10 are formed in a manner that one of their endmost parts is exposed to either of the corresponding surfaces of the laminate 30 in order to allow to contact between internal electrodes 10 and terminal electrodes 40.

As an example, the MLCC in accordance with embodiments of the present invention may be prepared as follows. A paste for forming dielectric layers containing dielectric materials and the conductive paste in accordance with embodiments of the present invention are alternately printed and the resulting laminate is plasticized. The conductive paste is applied to the cross-section of the laminate 30, in order to effect electrical and mechanical conjugation between the cross-sections of the plasticized laminate 30 and the endmost parts of the internal electrodes 10 exposed thereto. This is followed by plasticizing to form terminal electrodes 40. The MLCC in accordance with embodiments of the present invention is not limited to the embodiment shown in FIG. 3, and may have a variety of shapes, dimensions, laminates and circuit configurations.

EXAMPLES

Now, the embodiments of the present invention will be described in more detail with reference to the following Examples. These examples are provided only for illustrating embodiments of the present invention and should not be construed as limiting the scope and spirit of embodiments of the present invention.

Example 1

Figure 4:
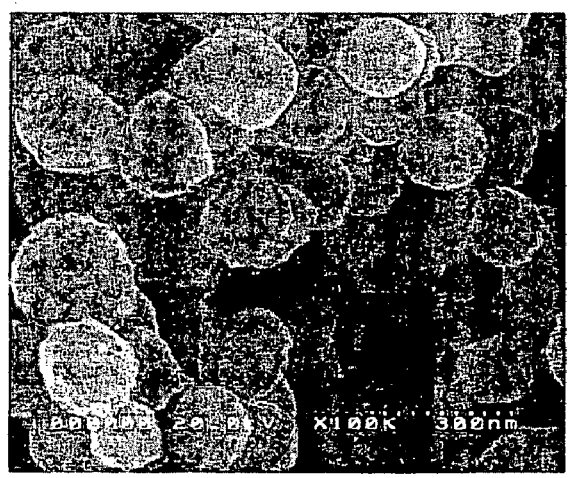
FIG. 4 is an SEM of surface-treated nickel nanoparticles obtained in Example 1.
Figure 5:
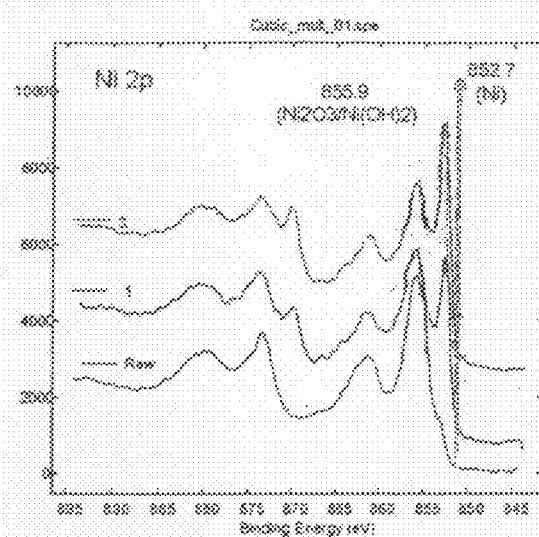
FIG. 5 is a graph showing XPS analytical results of surface-treated nickel nanoparticles obtained in Examples 1 and 3.

40 g of nickel, prepared using a wet chemical method, was dispersed in 500 g of ethyleneglycol to obtain homogeneous particles. To a flask equipped with a condenser on the upper part thereof, the resulting dispersion was charged and stirred. The mixture contained in the flask was heated at about 190° C. for 2 hours using a heating mantle equipped with a magnetic stirrer, so as to produce nickel metal powder having a smooth surface. The resulting nickel metal powder was filtered and washed with acetone and ethanol. The thus-obtained nickel metal powder was dried in vacuo overnight at a temperature of 25° C. An SEM of nickel particles thus obtained is shown in FIG. 4. The tap density of the nickel metal powder was measured by placing a predetermined amount of the powder in a 50 ml cylinder and tapping the powder about 2000 times, followed by volumetric determination. The tap density of particles before surface treatment was 1.42 g/ml, while the tap density of particles after surface treatment was determined to be 1.77 g/ml. FIG. 5 shows X-ray Photoelectron Spectroscopy (XPS) analytical results of the thus-obtained nickel particles. As can be confirmed from the XPS results, large amounts of surface $Ni(OH)_2$ were removed and the nickel content was relatively increased.

Example 2

Figure 6:
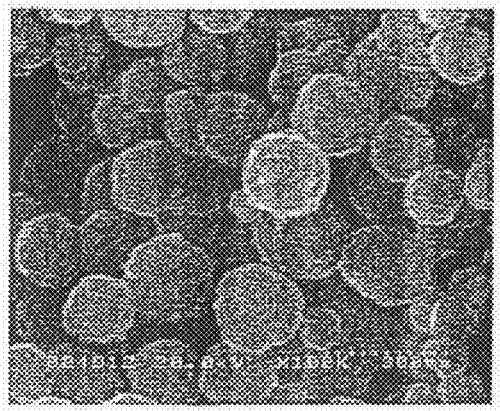
FIG. 6 is a SEM of surface-treated nickel nanoparticles obtained in Example 2.

40 g of nickel, prepared using a wet chemical method, was dispersed in 500 g of octanol to obtain homogeneous particles. To a flask equipped with a condenser on the upper part thereof, the resulting dispersion was charged and stirred. The mixture contained in the flask was heated at about 190° C. for 2 hours using a heating mantle equipped with a magnetic stirrer, so as to produce nickel metal powder having a smooth surface. The resulting nickel metal powder was separated and washed with acetone and ethanol. The thus-obtained nickel metal powder was dried in vacuo overnight at a temperature of 25° C. An SEM of nickel particles thus obtained is shown in FIG. 6. The tap density of particles before surface treatment was 1.42 g/ml, while the tap density of particles after surface treatment was determined to be 1.78 g/ml, representing a 25% increase in tap density.

Example 3

Figure 7:
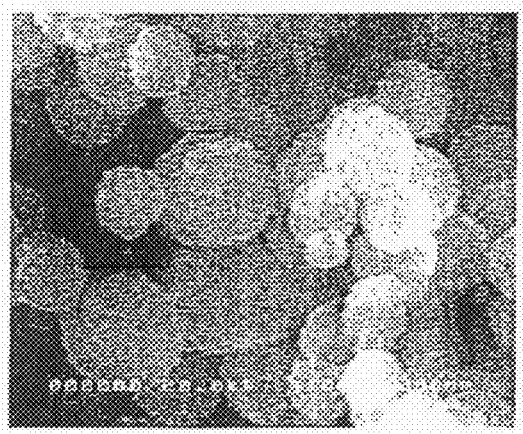
FIG. 7 is a SEM of surface-treated nickel nanoparticles obtained in Example 3.

500 g of triethyleneglycol and 1 g of NaOH were mixed to prepare a first solution. 40 g of nickel, prepared using a wet chemical method, was dispersed in the first solution to prepare a second solution. To a flask equipped with a condenser on the upper part thereof, the second solution was charged and stirred. The mixture contained in the flask was heated at about 230° C. for 2 hours using a heating mantle equipped with a magnetic stirrer, so as to produce nickel metal powder having a smooth surface. The resulting nickel metal powder was filtered, separated and washed with acetone and ethanol. The thus-obtained nickel metal powder was dried in vacuo overnight at a temperature of 25° C. An SEM of nickel particles thus obtained is shown in FIG. 7. The tap density of particles before surface treatment was 1.42 g/ml, while the tap density of particles after surface treatment was determined to be 1.98 g/ml. FIG. 5 shows X-ray Photoelectron Spectroscopy (XPS) analytical results of the thus-obtained nickel particles. As can be confirmed from the XPS results, large amounts of surface $Ni(OH)_2$ were removed and the nickel content was relatively increased.

Example 4

Figure 8:
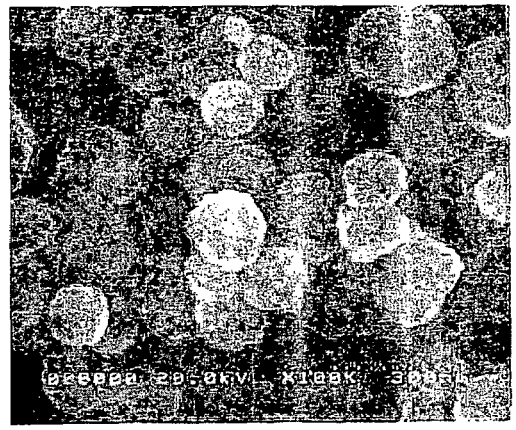
FIG. 8 is a SEM of surface-treated nickel nanoparticles obtained in Example 4.

500 g of 1,3-propanediol and 1 g of NaOH were mixed to prepare a first solution. 40 g of nickel, prepared using a wet chemical method, was dispersed in the first solution to prepare a second solution. To a flask equipped with a condenser on the upper part thereof, the second solution was charged and stirred. The mixture contained in the flask was heated at about 190° C. for 2 hours using a heating mantle equipped with a magnetic stirrer, so as to produce nickel metal powders having a smooth surface. The resulting nickel metal powder was separated and washed with acetone and ethanol. The thus-obtained nickel metal powder was dried in vacuo overnight at a temperature of 25° C. An SEM of nickel particles thus obtained is shown in FIG. 8. The tap density of particles before surface treatment was 1.42 g/ml, while the tap density of particles after surface treatment was determined to be 1.99 g/ml, which represent an increase of about 40% in tap density.

Comparative Example 1

Figure 9:
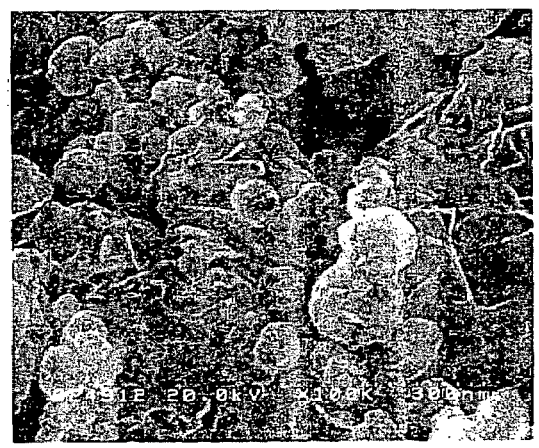
FIG. 9 is a SEM of surface-treated nickel nanoparticles obtained in Comparative Example 1.

40 g of nickel, prepared using a wet chemical method, was dispersed in 500 g of terpineol to obtain homogeneous particles. To a flask equipped with a condenser on the upper part thereof, the resulting dispersion was charged and stirred. The mixture contained in the flask was heated at about 200° C. for 12 hours using a heating mantle equipped with a magnetic stirrer, so as to produce nickel metal powder having a smooth surface. The resulting nickel metal powder was filtered, separated and washed with acetone and ethanol. The thus-obtained nickel metal powder was dried in a vacuum oven overnight at a temperature of 25° C. An SEM of nickel particles thus obtained is shown in FIG. 9.

Comparative Example 2

Figure 10:
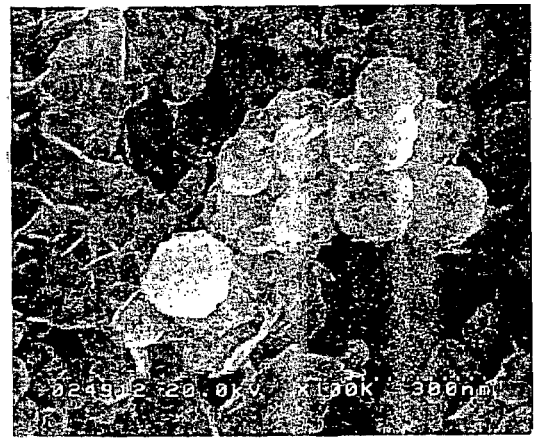
FIG. 10 is a SEM of surface-treated nickel nanoparticles obtained in Comparative Example 2.

40 g of nickel, prepared using a wet chemical method, was dispersed in 500 g of tetradecane to obtain homogeneous particles. To a flask equipped with a condenser on the upper part thereof, the resulting dispersion was charged and stirred. The mixture contained in the flask was heated at about 200° C. for 12 hours using a heating mantle equipped with a magnetic stirrer, so as to produce nickel metal powder having a smooth surface. The resulting nickel metal powder was separated and washed with acetone and ethanol. The thus-obtained nickel metal powder was dried in a vacuum oven overnight at a temperature of 25° C. An SEM of nickel particles thus obtained is shown in FIG. 10.

Comparative Example 3

Figure 11:
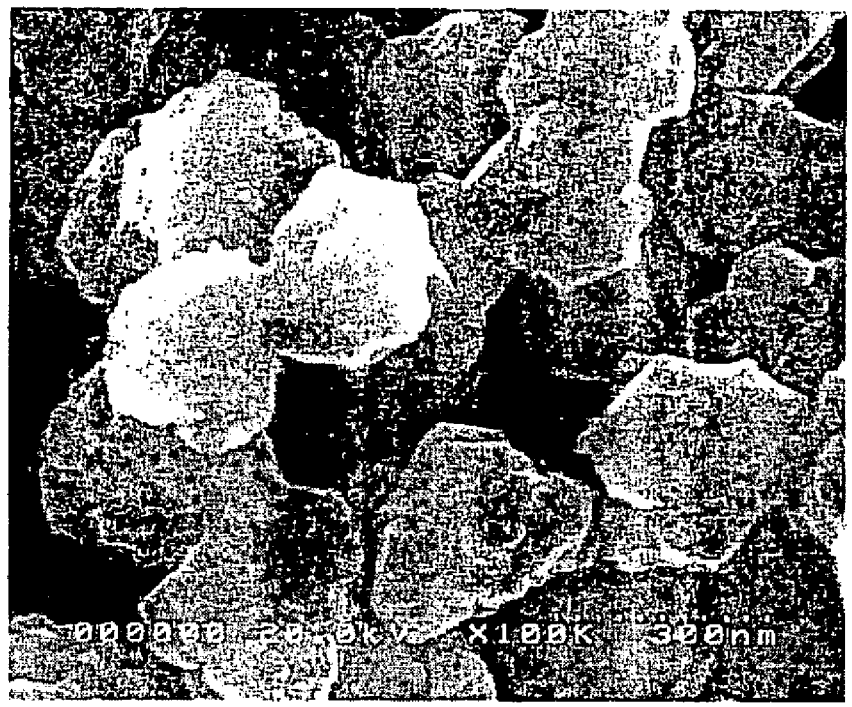
FIG. 11 is a SEM of surface-treated nickel nanoparticles obtained in Comparative Example 3.

40 g of nickel, prepared using a wet chemical method, was dispersed in 500 g of tetraethyleneglycol to obtain homogeneous particles. To a flask equipped with a condenser on the upper part thereof, the resulting dispersion was charged and stirred. The mixture contained in the flask was heated at about 200° C. for 12 hours using a heating mantle equipped with a magnetic stirrer, so as to produce nickel metal powder having a smooth surface. The resulting nickel metal powder was separated and washed with acetone and ethanol. The thus-obtained nickel metal powder was dried in a vacuum oven overnight at a temperature of 25° C. An SEM of nickel particles thus obtained is shown in FIG. 11.

As described above, use of the method of the embodiments of the present invention in surface treatment of nickel nanoparticles enables removal of impurities remaining on surfaces thereof, thereby yielding nickel nanoparticles having smooth surfaces and increased tap density.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for the modification through surface treatment of nickel nanoparticles comprising:

dispersing nickel nanoparticles formed by a wet chemical process having a diameter of 100 nm to 1,000 nm and impurities of $Ni(OH)_2$ and/or $Ni_2O_3$ adhering to their surfaces in a reductive organic solvent which is a primary or secondary alcohol containing 3 to 8 carbon atoms or a glycol containing 2 to 6 carbon atoms and a solution of a base selected from the group consisting of NaOH and KOH to obtain a dispersion wherein said nanoparticles are present in the dispersion in a concentration of 5 to 10% by weight based on the weight of said reductive organic solvent;

heating the resulting dispersion at a temperature 10 to 50° C. lower than the boiling temperature of said reductive organic solvent to provide surface modification wherein said $Ni(OH)_2$ and/or $Ni_2O_3$ adhering to the surfaces of said nickel nanoparticles is reduced to nickel metal so as to increase a surface homogeneity of the nickel nanoparticles;

separating the resulting nickel nanoparticles from the dispersion; and washing and drying the resulting modified nickel nanoparticles to provide a nanoparticle product having increased surface homogeneity and an increased tap density when compared to that of the starting material.

2. The method according to claim 1, wherein the modified nanoparticles following said washing and drying are substantially free of surface impurities.

3. The method according to claim 1, wherein the reductive organic solvent is at least one of propanediol, butanediol, pentanediol, octanol, ethyleneglycol, diethyleneglycol, dipropyleneglycol, and hexyleneglycol.

4. The method according to claim 1, wherein said basic solution is added to said dispersion of nickel nanoparticles in an amount between 0.2 and 1% by weight relative to said reductive organic solvent.

5. The method according to claim 1, wherein said basic solution is added to said dispersion of nickel nanoparticles in an amount of more than 0.1% by weight relative to said reductive organic solvent.

6. The method according to claim 4, wherein said base of said basic solution is NaOH.

7. The method according to claim 4, wherein said base of said basic solution is KOH.

* * * * *